R. C. NEFF.
NAILING MACHINE.
APPLICATION FILED APR. 23, 1914.

1,304,900.

Patented May 27, 1919.
3 SHEETS—SHEET 1.

Attest:
H. Wyman
John O. Firmin

Robert C. Neff
Inventor:
by W. Jay Emerson
Atty

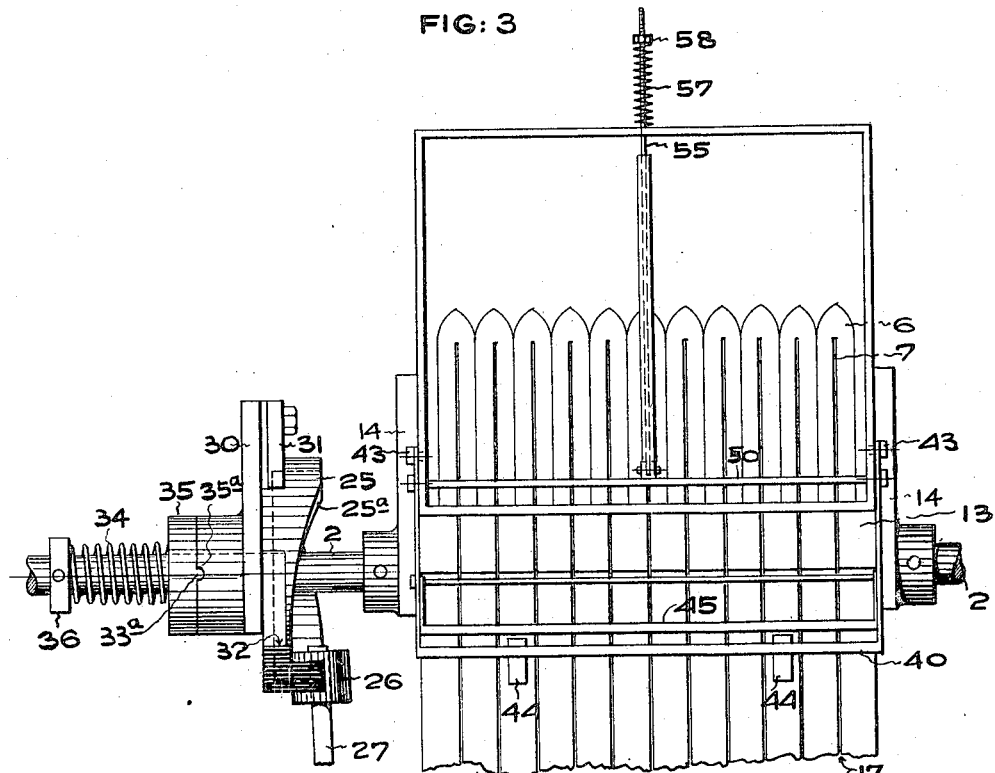
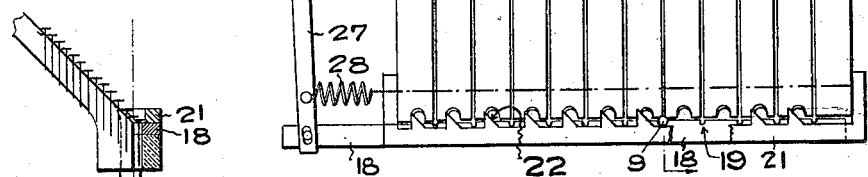
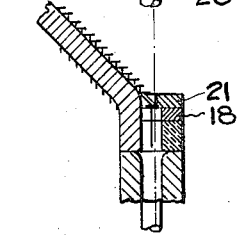
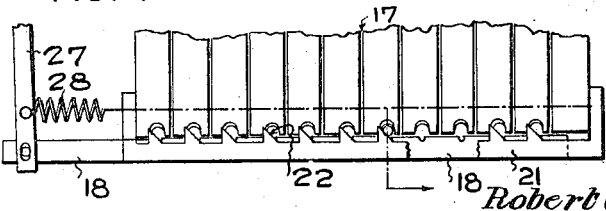

R. C. NEFF.
NAILING MACHINE.
APPLICATION FILED APR. 23, 1914.
1,304,900.
Patented May 27, 1919.
3 SHEETS—SHEET 3.
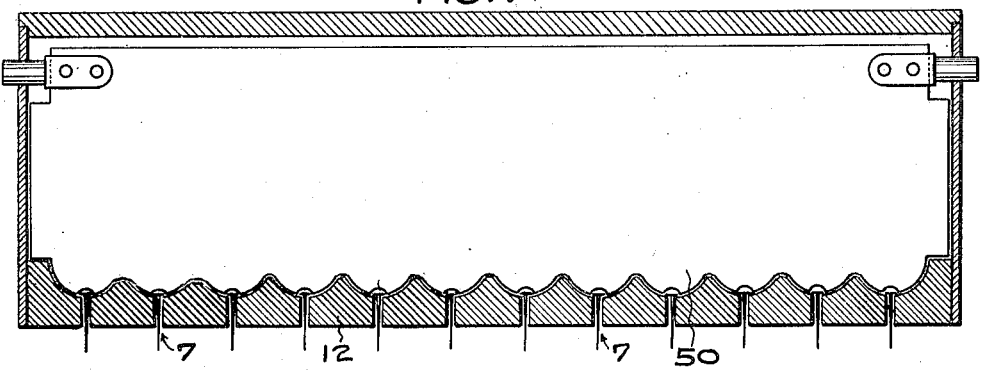
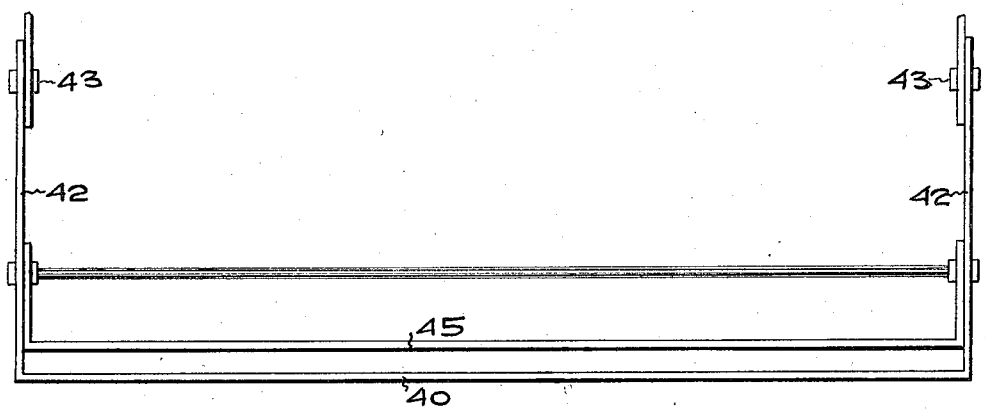
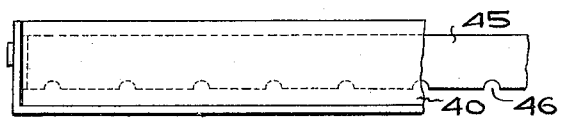
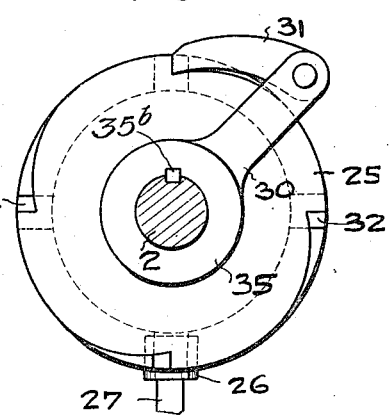
Attest:
Robert C. Neff,
Inventor:
by W. Jay Tunison
Atty

UNITED STATES PATENT OFFICE.

ROBERT CASSELLMAN NEFF, OF BROOKLYN, NEW YORK, ASSIGNOR TO CARL F. BOKER, OF NEW YORK, N. Y.

NAILING-MACHINE.

1,304,900.

Specification of Letters Patent. Patented May 27, 1919.

Application filed April 23, 1914. Serial No. 833,933.

*To all whom it may concern:*

Be it known that I, ROBERT C. NEFF, a citizen of the United States, residing in the borough of Brooklyn, in the county of Kings and State of New York, have invented certain new and useful Improvements in Nailing-Machines, fully described and represented in the following specification and the accompanying drawings, forming a part thereof.

Figure 1:
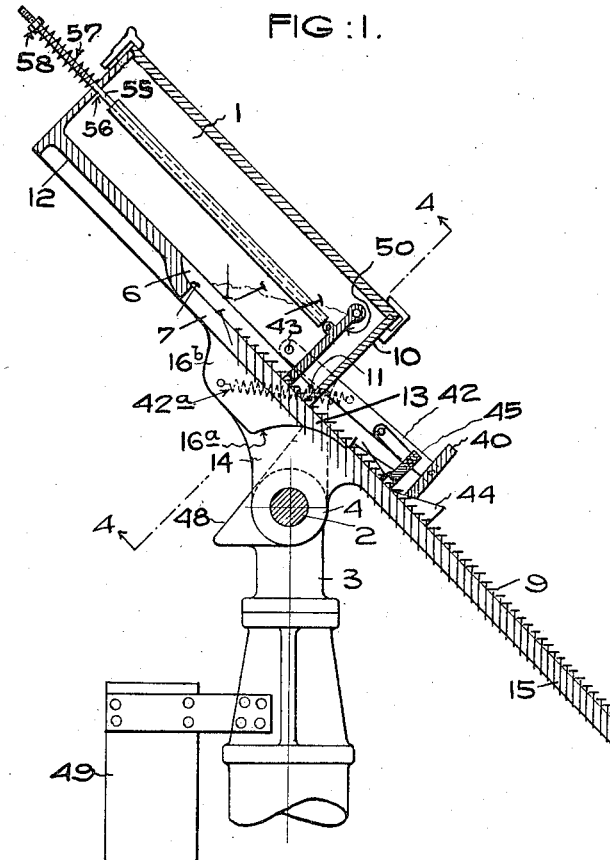
Figure 2:
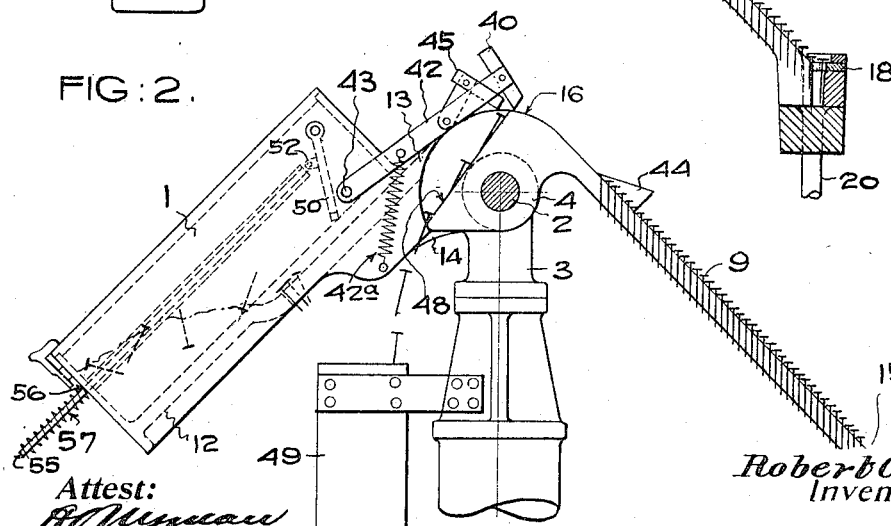

My invention relates to nail selecting and feeding mechanism and has for its object to produce an improved device of the class referred to. In the accompanying drawings, illustrative of a preferred embodiment of my invention, and made a part of this specification, Figure 1 is a side elevation of my apparatus shown detached from a nailing machine, to which it applies, showing the hopper in an elevated position; Fig. 2 is a partial view of the same showing the hopper depressed; Fig. 3 is a plan view of the mechanism as shown in Fig. 1; Fig. 4 is a partial plan view showing parts of Fig. 3 in a moved position; Figs. 5 and 6 are section details of parts shown in Figs. 3 and 4; Fig. 7 is a partial sectional view of the hopper, showing swinging door therein; Figs. 8 and 9 are enlarged partial views of parts shown in Fig. 1; and Fig. 10 is a sectional end view of mechanism shown in Fig. 1.

Having reference to the drawings, 1 represents a nail hopper attached to a rock shaft 2, which is supported upon uprights 3, the upper portion only of which is deemed necessary to illustrate in this connection, which is supported upon whatever machine or apparatus which my invention is employed to supply with nails, and at the top end thereof has journaled bearings 4 in which said rock shaft is pivotally mounted. At the outer end of the shaft 2 is an arm 5, which is suitably connected by a crank or otherwise to the source of power by means of which the said shaft is rocked to carry the hopper into the respective positions shown in Figs. 1 and 2. A convenient way for operating, which is illustrated in my application Serial No. 833,931, filed April 23, 1914, but any commonly employed means may be employed to impart this familiar motion to the shaft, in proper relationship with the mechanism to which it attaches.

The hopper in the present form of my invention, consists of a four-sided box, having a bottom 12, whose forward end is provided with a series of concave grooves 6, which have longitudinally disposed along their bottom, similar slots or openings 7, through the bottom of the hopper. The width of the slots 7, is slightly greater than the nails 9, but not so wide as to permit the head to fall through, and the length is substantially the full length of the bottom portion of said grooves 6 which for all practical purposes may be about one half the length of the hopper box.

The hopper has a forward end 10 having a series of openings which may be called the port holes 11, which have their position immediately over corresponding slots 7 at the point where the floor of the box 12 passes under and beyond the front end 10, and each of these openings is of sufficient height and width to permit the head to pass through the same under the bottom while the body portion is hanging within the slots, the nail resting in such position supported by its head. The bottom 12 of the hopper is extended forward to form a porch-like portion 13 through which the slots 7 continue in straight parallel alinement, furnishing means for guiding the nails after they have passed out of the box through said port holes to be transferred to similar slots in the incline chute casting 15, which is mounted at its upper end on the rock shaft 2; or, more freely described, said casting 15 is integral with the upright 3, which furnish the bearings 4 in which said shaft is loosely mounted.

The hopper 1 is supported upon brackets 14 which are screwed to the end of a reinforced portion extending forwardly at the bottom and laterally to either side of the hopper, said brackets being keyed to the rock shaft 2, at either side of the journal bearings 4, supplied by the chute casting 15, which supports said shaft. The chute casting 15 is rounded off at its upper end concentric with the shaft, forming the circular surface 16, upon which is adapted to fit a concave under surface 16$^a$, which is formed in the under surface of the reinforcing portion 16$^b$, which extends below the bottom of the hopper to the respective sides of the brackets 14, and forwardly to the end of the porch-like extension 13. The slots 17 in the chute extend through the full width of the circular surfaces 16, to the bottom of the casting 15.

The chute casting 15 is preferably inclined at an angle of approximately 45° and at its lowermost end is provided a reciprocating escapement slide 18, which extends the width of the chute and is suitably mounted in guiding bearings at the bottom thereof, presenting an opposing edge to the bottom terminus of each of the slots 17, so that the nails guided by these slots 17, with the heads resting upon the surface, will descend until the lowermost nail rests against the edge of the slides 18, or rather, within one of a series of notches 19, which is opposite each of said chutes when the slide is in its normal position of rest. The notches 19 are of sufficient depth to contain the body of the nail to be operated upon thereby or slightly deeper than the diameter of the body of the nail, but not of sufficient depth to receive a second nail.

The reciprocating slide 18 is adapted to move to a sufficient extent to convey its notches 19 from the nail slots to place them immediately over the tops of the nail tubes 20, which are suitably incased within the casting 15, at its bottom, supporting and conveying the nails thence into the nailing chucks. Above the reciprocating slides 18 is what may be designated the cam bar 21, having a series of camming surfaces 22, corresponding in number and relative arrangement to the notches 19 of the slide and resting immediately thereupon. In form the individual cam surface 22 has its lowermost portion cut to an equal depth with that of the notches 19 and continuing this depth for a short distance equaling in length the initial portion of the forward stroke of the slide 18, said cam surface immediately inclines upwardly to a point over-hanging the central axis of the top of the nail tubes 20, there being provided one of these cams for each of the notches 19. Therefore, as the reciprocating slide is moved laterally to the position over the tubes 20, they carry the nail to the high point of the respective cam surfaces 22, and the nails are in this manner elevated out of the notches 19, in which they rested as the reciprocating slide 18 starts forward.

The nail ejecting slide 18 is actuated by means of a cam 25, loosely mounted on the rock shaft 2, having, in the form illustrated, four similar lateral cam surfaces against which the roll 26 on the cam lever 27 is adapted to run, being held in engaging relationship therewith by a spiral spring 28, attached to the lower end thereof and to the casting 15, as shown in Fig. 3. The lever 27 is pivotally mounted upon a bracket extending laterally from the chute casting 15 by means of a pin. The cam 25 is intermittently driven by the ratchet arm 30 which is keyed to the shaft 2 and has a ratchet pawl 31 adapted to engage one of a plurality of ratchet teeth 32 upon the periphery of the cam 25, said ratchet teeth 32 and the cam surfaces 25 corresponding in number and arrangement, there being four of each, so that with each rocking motion of the shaft 2, the arm 30 is carried forward and by means of its pawl 31 intermittently rotates the cam 25 loosely mounted on said shaft to substantially a quarter revolution. Upon the return motion of the shaft 2, the ratchet arm and teeth return to their normal position in which said pawl drops into the next succeeding ratchet tooth 32 to move the cam another one fourth of a revolution on the next succeeding actuation of the ratchet arm 30.

The ratchet arm 30 has its hub loosely mounted upon the rock shaft 2, and is normally held against the end surface of the cam 25, by means of a collar 35, which is slidably supported on the shaft 2 by means of a spline 35$^b$ (Fig. 10) attached in the usual manner, which collar is held operably against the hub of the lever ratchet arm 30, by means of a compression spring 34, so that the rounded tooth 33$^a$ on the collars 35 is brought into engagement with a correspondingly concaved notch 35$^a$ in the hub of the ratchet arm 30. The compression spring 34 on the shaft 2 is held at its outer end by a collar 36, which is attached to the shaft 2, by means of a set screw that permits suitable adjustment of the tension of this spring. Hence, the rounded tooth 33$^a$ being held in its semi-circular socket 35$^a$ by means of the compression spring 34 bearing against the collar 35 which it has been seen is slidably mounted on the shaft 2, and held against rotatable movement by means of the spline 35$^b$ on said shaft will when the shaft 2 is rotated, transmit a semi-positive action to the ratchet arm 30, loosely supported on said shaft, until a considerable resisting force is presented to the swinging action of the ratchet arm 30, whereupon the notched teeth 33$^a$ will be forced out of contact with the hub of the ratchet arm. Thus is provided means for preventing injury to the comparatively delicate nail ejecting mechanism operated by the ratchet arm 30, should an obstruction occur therein.

Thus it has been seen that when the shaft 2 is rocked to throw the hopper into the forward position shown in Fig. 1, by the usual action of similar mechanism, a series of nails may be thrown into the slots of the chute 15 where they will slide down the incline surface until they reach the bottom or rest upon the nails which had been previously transferred to the slots. The number of nails thrown into the different chutes with each operation of the hopper, however, varies greatly and many times it occurs that no nails at all will be thrown into certain of the chutes, while at the same forward motion of the hopper, a large number of these may be thrown into other chutes. Furthermore, at times the hopper may be rocked a number of times without depositing any nails whatever in the chute slots, while at other times upon each reciprocation thereof an over-supply of nails may be precipitated. Therefore, it is found desirable to facilitate the action of the hopper in thus supplying nails to the chutes, but at the same time, it will be apparent that a surplus of nails in any of the slots in the chute will possibly cause damage to the mechanism if such excess is not removed.

To obviate the undesirable possibility above described there is provided a mechanism which withdraws the nails which have been deposited in one of the chutes above a certain height, which comprises a bar 40 extending transversely the width of the chute casting 15, being loosely pivoted upon the respective sides of the hopper 1, and adapted to rest normally upon the surface of the chute. This nail withdrawing bar has an edge resting upon the chute casting and is held by gravity to slide laterally over the face of the chute, resting thereon during the return motion of the hopper while passing from the position as illustrated in Fig. 1 to that shown in Fig. 2. The supporting arms 42 formed by bending the ends of the bar 40 at right angles thereto as a pivotal support are loosely attached to the respective sides of said hopper by means of the studs 43, and are of sufficient length to carry the bar 40 to a point immediately in front of the extension 13 of the hopper floor 12. Thus it will be seen the bar 40 is designed to rest upon the surface of the chute during the return stroke of the hopper. During the forward stroke of the hopper, the bar 40 rests upon the chute until approaching the end of the stroke where it rises, there being provided a beveled cam piece 44 which lifts the bar 40 above the surface of the chute 15, which occurs, it will be borne in mind, on the latter portion of the forward vibration of the hopper so that at the moment the nails are cast out of the hopper, the bar 40 will be elevated (see Fig. 1) so as to permit the free passage of the nails down the chute, passing under the bar, and on the return thereof, the bar on descending from the beveled piece 44 returns to the surface of the chute 15, and back, with it to the top of the chute casting, as best shown in Fig. 2 any nails that have not been thrown beyond that point by the motion of the hopper, whereupon the nails drop upon the inclined surface 48 and thence into the receptacle 49 conveniently arranged at the bottom of the incline 48.

The nail withdrawing bar however, as thus far described, will operate only to withdraw nails that have been thrown into the slots, being carried upwardly by action of the bar 40 in contacting the heads as they rest upon the upper surface of the chute 15. It has been found in practice however, that nails occasionally are thrown entirely out of the chutes and fall upon the surface in various ways. For the purpose of clearing the chute of such obstructing nails out of place, additional means comprising the notched bar 45 has been provided which is similar in construction and mode of operation to the bar 40 above described. The bar 45 is accordingly loosely and pivotally attached to the inner surface of the supporting arms 42 of the bar 40 and in similar manner to the action of the bar 40 is held by gravity upon the face of the chute. These two scraping bars as stated operate in the same general manner, except that the notched bar 45 will not affect nails in the chutes, having been provided with semicircular openings 46, along the bottom edge thereof, arranged one over each of the chutes. But it will be seen that as such openings are of such size and so disposed along the bottom of the bar 45 that the heads of the nails only can pass under the bar 45, as it is carried back, which bar will take with it any nails that have fallen on the surface of the chute which are not properly within the slots thereof. Thus the two bars operating together will withdraw not only the nails that have been fed into the chute and are resting above the line that marks the contact of the bar 40 upon the chute 15, but also any nail that may be lying loosely upon the surface thereof.

While the bars 40 and 45 respectively have been described as held in operable position in connection with the surface of the chute 15 by action of gravity, in actual practice it has been found necessary to use springs 42$^a$, attached to the hopper supporting brackets 14, on either side, said spring being also attached to the arms 42 about midway of the length thereof, aiding the action of gravity, by holding the bars 40 and 45 down upon the surface of the chute.

The outer portion of the bottom extension 13 has been seen to have been concaved to correspond with the circular top 16, of the chute 15. This rounded portion forms the top of the chute; and at a point slightly back of the vertical line cutting through the center of the rock shaft 2, the surface of the chute inclines downwardly to form the nail dumping incline 48, across which point the nail withdrawing bar 40 is drawn by the downward motion of the hopper as shown in Fig. 2 resting upon a continuation of the rounded portion. Hence it will be seen that the nail guiding extension 13 of the hopper floor has thus been withdrawn sufficiently to permit the nails that have been carried upwardly by the bars 40 and 45 to fall freely down the incline 48, there being provided a receptacle 49 at the bottom to receive the nails thus swept back from the surface of the chute.

It has been made clear that owing to the irregularity with which the nails may be fed into the individual nail selecting slots some of the slots may be supplied with an excess of nails, while others owing to the congestion in the grooves may not receive enough nails to supply the continual withdrawal at the bottom of the chute. I therefore employ means in my improved nail selecting mechanism for equalizing the nail selecting capacity of all the grooves and slots comprising an inner swinging end piece that is suspended from the top of the hopper by means of pivotal bearings on either side thereof, which are arranged so that normally, when the hopper is in its forward position as shown in Fig. 1 the swinging end piece will be resting in a position parallel with the forward end of the hopper and slightly removed therefrom for reasons presently to be explained.

The bottom of the swinging end as best shown in Fig. 7 is shaped to conform with and fit into the various nail selecting grooves, but not in immediate contact therewith, permitting freedom in swinging back and forth in relation thereto, and having immediately over the slots 7, the semicircular notches corresponding in shape and dimension somewhat to the port openings 11 in the front of the box, which are designed to provide clearance of the head of the nails suspended within the slots as the member swings back over them. The action of the swinging end is such that it will take its position parallel with the end of the box as the hopper is thrown into its forward position as shown in Fig. 1 where it performs practically the functions of the front end of the usual nail selecting hopper against which the nails are held in a promiscuous pile as they are thrown toward the front. When the hopper returns to its opposite position, as shown in Fig. 2 it permits the nails to fall back by gravity to the rear end of the box, and in perhaps the majority of instances the action as described, consisting of the unassisted vibrating motion of the hopper, would be sufficient to accomplish that purpose. But in actual practice it has often been found that nails interlock and wedge into the grooves and form a substantially stationary mass of greater or less extent at the forward end of the hopper, thereby preventing the normal passage of the nails into the grooves and down the chutes, for use in the nailing machines.

Therefore, to provide against congestion of nails as above described, the swinging end 50, pivoted at its top in the manner described, is swung backwardly upon its pivotal support at each return vibration of the hopper, as pointed out, but in order to give the mechanism sufficient impetus to dislodge a matting of nails against it, additional force is supplied by means of a sliding rod 55, which is pivotally attached to a small bracket 52 on said swinging member. The opposite end of the rod 55 is slidably supported in an aperture 56, through the rear wall of the hopper. To the outer end of rod 55 may be attached a weight, if it be desired to increase the action of gravity thereon when thrown in position shown in Fig. 2 for the purpose of dislodging the nails in the bottom of the hopper. Or, as in the preferred embodiment of my mechanism, a compression spring 57 may be employed as illustrated in Figs. 1 and 2 upon the end of the rod protruding beyond the end of the hopper, one end of the spring pressing against the hopper, the other held against a collar 58 pinned to the end of the rod 55, upon which the end of the spring 57 impinges to throw the rod, and thereby draw the swinging end or door in the direction of the rear of the hopper. The tension of the spring 57 of course must be so regulated that it will not overcome the weight of the rod 55 and the door 50 in swinging to their normal position of rest as shown in Fig. 1.

To operate my apparatus, a quantity of nails will be placed in the hopper, preferably while it is in the position shown in Fig. 2, where they will rest upon the bottom toward the rear outside of the swinging member, and then starting the shaft 2 oscillating by any convenient means, such as that described hereinabove, the hopper will be thrown into the position shown in Fig. 1, in which the nails will have been carried against the swinging end 50 and in the process thereof a portion of the nails will have dropped into the slots with their bodies swinging downwardly, resting upon their heads and in this manner being guided into slots 7 by means of the concave grooves 6. A portion of the nails thus contained within the grooves 6 by means of the forward thrust of the hopper may be caused to slide longitudinally of their slot into suitable openings at the bottom of the member 50, thence through the port holes 11 at the front of the nail hopper along the top surface of the porch-like extension 13 into the slots 17 of the chute casing 15, and continuing downwardly until arrested in their descent by nails, if any, which may be resting within said slides 17, or until the lowermost nail in the respective chutes 17, rests within the corresponding notches 19 of the reciprocating slide 18. Other portions of the nails which have thus been guided into the slots 7 within the hopper may be prevented from thus passing through the ends into the chutes by reason of other nails, loosely resting in irregular order upon the top of the slot into which they have fallen, and therefore upon the return vibration of the hopper into the position shown in Fig. 2 such nails will slide backwardly along their grooves and still be retained therein, while the quantity of loose nails upon the bottom of the hopper will pass over them and be precipitated into the lowermost portion at the rear of the hopper; hence it will be seen that when the hopper is again rocked into the position shown in Fig. 1, the nails thus contained within the slots in the bottom of the hopper, will be given another opportunity to slide along their slots 7 under the swinging end 50 out into the grooves as previously described, prior to the loose nails being thrown over them or against the swinging end, to again impede their progress.

While the hopper is being vibrated to eject the nails in the manner described, the ratchet arm 30 is accordingly vibrated with each rocking motion of the shaft 2, being thrown forwardly by reason of the tooth 33ᵃ upon the collar 35 splined to said shaft 2, said tooth being held in operable contact with a correspondingly concaved notch 35ᵃ in the hub of the ratchet arm 30, said tooth being held in operable engagement with said notch by means of the compression springs 34 being held laterally against said collar 35 by means of a second collar 36, which is adjustably secured to the shaft 2 by means of the screw therein.

As the ratchet arm 30 is carried forward in the manner described, its pawl 31 which is pivotally attached thereto and held by its own weight, in engaging relationship with the teeth 32 on the cam 25 as the end of said pawl runs along the periphery of said cam. As the arm 30 is vibrated backwardly into its rearmost position, the pawl 31 drops into another of the four teeth 32 upon the periphery of the cam 25, the ratchet arm being carried substantially 90 degrees during each partial forward rotation of the shaft 2. As the ratchet arm 30 thus carries the cam roll 25 through 90 degrees of its rotation, one of the four cam surfaces 25ᵃ upon the face thereof engages the cam roll 25 upon the lever 27 which is suitably mounted midway of its length upon the bracket 23 extending from the side of the chute bracket 15 so that after each movement of the cam the lever is oscillated laterally thereby causing the nail ejecting slide 18 to reciprocate within its slide bearings 51. By the operation described, the lowermost nail in each of the chutes 17 which has been resting within the notch 19 of the reciprocating slide is carried laterally from the bottom of said slot into position immediately over the top of the nail tubes 20, through which the respective nails are carried to the nailing mechanism. The spiral spring 28, attached to the lower end of the cam lever 27 and to the chute casting 15, operates to hold the cam roll 26 always in engaging relationship with the cam surface 22 and said spring performs a further function in returning the nail ejecting slide to its normal position of rest with an abrupt stop so as to agitate the bottom of the chute casting to prevent the nails from hanging to the sides of their containing slots.

As the nail ejecting slide 18 is thus carrying the nail transversely from the bottom of the chute, it is guided by a series of cam surfaces 22 upon the cam bar 21, said cam surfaces corresponding with the notches 19 of the reciprocating slide, and are therefore adapted to guide the respective nails out of the notches 19 into which they are resting as the slide 18 operates, so that the nail is free to slide from the bevel edge of the high part of the cams 22 and to drop into its respective nail conducting tubes 20, the head of the nail having been carried out of the notch 19 by action of the cam surface 22 corresponding thereto.

Should any foreign matter such as a misplaced nail drop into the slots 17 or into the notches 19 of the slide so as to prevent its normal movement, the ratchet arm 30 which actuates the slide 18 in the manner described is adapted to disconnect itself, being operably connected with the shaft 2 by means of the yielding nature of the tooth connection between the collar 35 and the hub 33 of the ratchet arm, so that as the shaft continues to rotate it will not carry with it the intervening parts that operate the slide 18, thereby avoiding damage to those portions.

As the hopper 1 vibrates in the manner described to emit nails, the nail withdrawing bar 40 goes forward with the hopper until near the end of its stroke, when it rides upwardly on the beveled edge of a cam piece 44 upon the chute 15, permitting the nails that have been transferred to the slot 17 to pass thereunder, as they have previously passed under the notched bar 45 immediately back of the bar 40 so that free egress is permitted to all the nails that have been introduced into the slide above that point. But upon the return motion of the hopper to the position shown in Fig. 2, the bar 40 descending from the elevated position to which it has been carried by the cam piece 44, scrapes the top surface of the chute casting 15, and contacts with the heads of any nails which may be resting in the chute at that point, which nails with those above them, will be drawn upwardly until they reach the rear incline 48, through which they will then drop into receptacles 49, suitably arranged thereunder to receive them as they fall from the chute.

The nail ejecting slide 18 being actuated by means of the cam 25 acting through the oscillating lever 27, it is evident that with each nail ejecting movement thereof, the hopper and its associated posts will operate for the reason that said cam is operably connected to the rock shaft 2 to which the hopper is attached. Therefore as nails are withdrawn from the bottom of the chute casting 15 others are simultaneously fed into the top thereof, and in order to maintain a continuous supply of nails in the inclined chute with each vibration of the hopper its swinging end operates to keep the discharge openings of the hopper free from congestion of nails within the hopper and likewise the withdrawing bar simultaneously operates to prevent over supplying the slots in the chutes with nails.

Having described my invention, what I claim is:

1. In nailing machines, a nail feeding device comprising a hopper having a series of parallel grooves in the floor thereof and nail guiding slots in the bottom of said grooves; a swinging member at the forward end of said box pivotally supported at the top thereof, said member having projections conforming to the cross-section of said grooves and arranged operably to fit therein; said projections having semi-circular recesses over the slots in said grooves adapted to provide clearance spaces for the heads of nails in said slots; and means for swinging said member longitudinally of said slots and grooves, substantially as and for the purposes described.

2. In nailing machines, a rock shaft; a nail containing box operably attached at one end to said rock shaft and having nail selecting grooves and slots in the bottom thereof adjacent to said end, and having a series of openings in one end wall of the box at the bottom thereof and immediately over said slots; a swinging member suspended from its top within said box near said end adjacent the said shaft; said member having its lower or swinging end so shaped as to conform to the cross-section of said grooves; means for successively elevating and lowering said box by rocking said shaft; and means for swinging said member as said box is raised and lowered, comprising a longitudinally sliding bar pivotally attached to the side of said swinging member and slidably supported in the swinging end of said hopper opposite to said member, an adjustable collar, and a spring upon the outer end of said bar held thereon by means of said adjustable collar at the end of said bar.

3. In nailing machines, a rock shaft; a nail feeding hopper operably attached to said rock shaft; means for rocking said shaft, the arrangement being such that said box is successively raised and lowered by the rocking of said shaft; means for feeding the nails therefrom comprising parallel slots longitudinally disposed in the bottom of said hopper; a nail supporting chute having nail guiding slots therein similar in size to the slots in said hopper and arranged in longitudinal alinement therewith; means for transferring nails from the slots in the said hopper to corresponding slots in said chute, comprising a forward extension on said hopper having a concave portion and a concentric convex portion at the top of said chute corresponding in curvature with the curvature of said hopper extension; means comprising a transverse bar pivoted to said hopper for withdrawing nails from said chute; and means comprising a beveled cam piece upon the top surface of said chute arranged to lift said transverse bar from the surface of said chute at the end of the forward stroke of said bar when said hopper has been elevated by the action of said rock shaft, substantially in the manner and for the purposes shown.

4. In nailing machines, a rock shaft; a nail feeding hopper operably supported upon said rock shaft, the arrangement being such that said hopper is successively raised and lowered by the rocking of said shaft; a nail chute supporting said rock shaft and having a series of vertical slots suitably disposed in parallel longitudinal arrangement within said chute; means for transferring nails from said hopper into said nail-containing slots; and means for withdrawing nails therefrom comprising a plurality of bars, one of said bars being arranged to remove nails longitudinally within said slots, and the other of said bars being constructed and arranged to remove nails from the surface of said chute, substantially as and for the purposes shown.

5. In nailing machines, a rock shaft; a nail feeding hopper operably supported upon said rock shaft; a nail guiding chute having bearings supporting said rock shaft; means for transferring nails from said hopper to said chute, comprising actuating means for rocking said shaft, the construction and arrangement being such that said hopper is alternately raised and lowered by the rocking of said shaft; a nail ejecting slide suitably supported with relation to said chute; a cam on said rock shaft and a lever having a roll thereon in operable contact with said cam; yielding means for actuating said cam and said slide by the rotatable movement of said shaft in one direction; and means comprising springs for carrying said slide in the opposite direction, substantially as and for the purposes shown.

6. In nailing machines, a rock shaft; a nail feeding hopper operably supported upon said rock shaft; a nail containing chute having bearings supporting said rock shaft; means for transferring nails from said hopper to said chute, comprising actuating means for rocking said shaft, the construction and arrangement being such that said hopper is alternately raised and lowered by the rocking of said shaft; a nail ejecting slide suitably supported with relation to said chute; means for reciprocating said slide comprising a cam with ratchet teeth on said rock shaft and a lever having a roll thereon in operable contact with said cam; yielding means for actuating said cam and said slide by the rotatable movement of said shaft in one direction; means comprising springs for actuating said slide in the opposite direction, said actuating means comprising a ratchet arm loosely mounted on said shaft and having a pawl pivotally attached thereto in engaging relationship with the teeth on the periphery of said cam; and means for vibrating said ratchet arm comprising a rounded tooth projection on the hub of said arm and a collar slidably mounted upon said shaft adjacent to the hub of said arm, said collar having a concaved notch into which said tooth projection is adapted to fit, and a compression spring upon said shaft held against said notched collar at the end of said spring.

7. In nailing machines, a nail guiding casting comprising a chute having parallel vertical walled slots longitudinally disposed therein; a rock shaft operably supported at the upper end of said chute; a nail feeding hopper rigidly attached to said rock shaft; means for rocking said shaft and successively raising and lowering said nail hopper, whereby nails are transferred from slots provided in said hopper to similar slots in said chute; means for removing nails from the top portion of said slots comprising transverse bars operably attached to said hopper; means for removing nails from the bottom portion of said slots comprising a reciprocating slide suitably mounted in said chute; a cam upon said rock shaft and a lever pivotally supported upon said casting, adapted to reciprocate said slide as said hopper is raised and lowered; and means for simultaneously actuating said hopper, said nail removing bars and said reciprocating slide, substantially as and for the purposes described.

In testimony whereof, I have hereunto set my hand in the presence of two subscribing witnesses.

ROBERT CASSELLMAN NEFF.

Witnesses:
EDNA X. LEE,
ANNA W. DILLMAN.

Copies of this patent may be obtained for five cents each, by addressing the "Commissioner of Patents, Washington, D. C."